(12) United States Patent
Okada

(10) Patent No.: US 10,202,301 B2
(45) Date of Patent: *Feb. 12, 2019

(54) APPARATUS FOR MANUFACTURING AN OPTICAL FIBER

(71) Applicant: FUJIKURA LTD., Koto-ku, Tokyo (JP)

(72) Inventor: Kenji Okada, Sakura (JP)

(73) Assignee: FUJIKURA LTD., Koto-ku, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/480,493

(22) Filed: Apr. 6, 2017

(65) Prior Publication Data

US 2017/0210664 A1    Jul. 27, 2017

Related U.S. Application Data

(62) Division of application No. 14/757,428, filed on Dec. 23, 2015, now Pat. No. 9,650,283.

(30) Foreign Application Priority Data

Dec. 26, 2014   (JP) .................................. 2014-266308

(51) Int. Cl.
  *C03B 37/03*  (2006.01)
  *B65H 57/04*  (2006.01)
  (Continued)

(52) U.S. Cl.
  CPC ........... *C03B 37/032* (2013.01); *B65H 57/04* (2013.01); *C03B 37/0253* (2013.01);
  (Continued)

(58) Field of Classification Search
  CPC ... C03B 37/025–37/0279; B65H 57/04; B64H 2406/111
  See application file for complete search history.

(56) References Cited

U.S. PATENT DOCUMENTS

2009/0139269 A1  6/2009  Filippov et al.
2009/0139270 A1  6/2009  Filippov et al.
              (Continued)

FOREIGN PATENT DOCUMENTS

CN    101541695 A   9/2009
CN    101925548 A   12/2010
              (Continued)

OTHER PUBLICATIONS

Crane Co., "Flow of Fluids Through Valves, Fittings, and Pipe", Crane Co., 1991, 2 pages. (Year: 1991).*

(Continued)

*Primary Examiner* — Lisa L Herring
(74) *Attorney, Agent, or Firm* — Sughrue Mion, PLLC

(57) ABSTRACT

An apparatus for manufacturing an optical fiber including: a drawing portion; a coating portion; and a curing portion, wherein: a direction changer which changes a direction of the bare optical fiber is disposed in any position from the drawing portion to the coating portion; the direction changer includes a guide groove which guides the bare optical fiber; a blowout port of a fluid which floats the bare optical fiber wired along the guide groove is formed along the guide groove in the guide groove; and in the blowout port, the Reynolds number in an inlet wire portion of the bare optical fiber to the guide groove and an outlet wire portion from the guide groove is greater than the Reynolds number in an intermediate portion between the inlet wire portion and the outlet wire portion.

6 Claims, 9 Drawing Sheets

(51) Int. Cl.
*C03B 37/025* (2006.01)
*C03C 25/10* (2018.01)
*G02B 6/02* (2006.01)
*C03C 25/106* (2018.01)

(52) U.S. Cl.
CPC ........ *C03C 25/106* (2013.01); *C03C 25/1055* (2013.01); *G02B 6/02395* (2013.01); *B65H 2406/111* (2013.01); *B65H 2701/32* (2013.01); *Y02P 40/57* (2015.11)

(56) References Cited

U.S. PATENT DOCUMENTS

| | | | |
|---|---|---|---|
| 2009/0158779 | A1 | 6/2009 | Faler et al. |
| 2009/0217710 | A1 | 9/2009 | Costello, III et al. |
| 2010/0281922 | A1 | 11/2010 | Costello, III et al. |
| 2010/0319406 | A1 | 12/2010 | Aoki et al. |
| 2011/0274404 | A1 | 11/2011 | Okada |
| 2011/0289979 | A1 | 12/2011 | Faler et al. |
| 2011/0289980 | A1 | 12/2011 | Filippov et al. |
| 2016/0168008 | A1 | 6/2016 | Bookbinder et al. |

FOREIGN PATENT DOCUMENTS

| | | |
|---|---|---|
| CN | 101952215 A | 1/2011 |
| CN | 102272063 A | 12/2011 |
| CN | 102906040 A | 1/2013 |
| CN | 102906041 A | 1/2013 |
| EP | 0493679 A2 | 7/1992 |
| JP | 5023434 | 3/1975 |
| JP | 62-3037 A | 1/1987 |
| JP | 04277167 A | 10/1992 |
| JP | 05024743 A | 2/1993 |
| JP | 09263357 A | 10/1997 |
| JP | 2010-510957 A | 4/2010 |
| JP | 2010-261874 A | 11/2010 |
| JP | 5571958 B2 | 8/2014 |
| WO | 2008/066661 A2 | 6/2008 |
| WO | 2009085114 A1 | 7/2009 |
| WO | 2009/110418 A1 | 9/2009 |
| WO | 2009108315 A2 | 9/2009 |

OTHER PUBLICATIONS

Communication dated Mar. 17, 2015, issued by the Japan Patent Office in corresponding Japanese Application No. 2014-265464.
Communication dated Oct. 5, 2016, issued by the U.S. Patent and Trademark Office in related U.S. Appl. No. 14/801,284.
Notice of Allowance for Japanese Patent Application No. 2014-266308, dated Jun. 2, 2015.
Notice of Reasons for Rejection for Japanese Patent Application No. 2014-266308, dated Mar. 17, 2015.
University of Oslow, "Flow in Pipes", https://www.uio.no/studier/emner/matnat/math/MEK4450/h11/undervisningsmateriale/modul-5/Pipeflow_intro.pdf, available Jan. 2013 per Wayback Machine, Chapter 8, pp. 321-343.
Communication dated Sep. 8, 2016, issued by the U.S. Patent and Trademark Office in related U.S. Appl. No. 14/757,428.
Communication dated Oct. 11, 2017 from the State Intellectual Property Office of the P.R.C. in counterpart Chinese application No. 201510977610.1.
Machine translation of JPS 62-003037 A, published Jan. 9, 1987 (reference submitted Apr. 6, 2017).
Communication dated Mar. 29, 2018 from the State Intellectual Property Office of the P.R.C. in counterpart Chinese application No. 201510363978.9.

* cited by examiner

APPARATUS FOR MANUFACTURING AN OPTICAL FIBER

CROSS REFERENCE TO RELATED APPLICATIONS

This application is a Divisional of U.S. application Ser. No 14/757,428, filed on Dec. 23, 2015, claiming priority from Japanese Patent Application No. 2014-266308, filed on Dec. 26, 2014, the entire contents of which are incorporated herein by reference.

BACKGROUND OF THE INVENTION

Field of the Invention

The present invention relates to an apparatus for manufacturing an optical fiber.

Description of Related Art

FIG. 15 is a schematic view showing a schematic configuration of an example of an apparatus of manufacturing an optical fiber of the related art.

The manufacturing apparatus includes a drawing unit 10 which forms a bare optical fiber 3 from an optical fiber preform 2, a cooling unit 120 which cools the bare optical fiber 3, a coating unit 30 which disposes a coating layer on the bare optical fiber 3 and forms an optical fiber intermediary body 4, and a curing unit 40 which cures the coating layer of the optical fiber intermediary body 4 to be an optical fiber 5.

During manufacturing the bare optical fiber, the bare optical fiber 3 is obtained by drawing the optical fiber preform 2 at the drawing portion 10. After cooling the bare optical fiber 3 at the cooling portion 120, a coating layer made of a resin is provided at an outer surface of the bare optical fiber 3 at the coating portion 30. The bare optical fiber 3 in which the coating layer is cured at the curing unit 40 is wound by winding means 70 through a pulley 50 and a take-up unit 60.

The bare optical fiber 3 obtained by drawing the optical fiber preform 2 is drawn toward a vertically lower direction along a linear path.

In the manufacturing method, there is a restriction on the height of the entire system as a factor affecting productivity. The reason that the height of the system is a main factor which restricts productivity is because it is necessary to ensure a distance for sufficiently cooling a bare optical fiber which is obtained by drawing the optical fiber preform.

When a new facility including a building is built, the restriction can be relaxed; however, an enormous cost is required for building a new facility, and when it is required that productivity is further improved in the future, it is necessary that a new facility will be built at higher cost.

As a method of relaxing the restriction, a method is included in which a direction changer including a non-contact retaining mechanism is used.

The non-contact retaining mechanism is for holding a target to be in a noncontact state using the pressure of a fluid such as air, and in the direction changer including the fluid bearing, it is possible to perform direction change with respect to the bare optical fiber without being in contact with the bare optical fiber (a bare fiber).

By using the direction changer, it is possible to change the direction of the bare optical fiber which is subjected to the fiber drawing from the optical fiber preform along the first path to conform to a second path (for example, refer to Japanese Patent No. 5571958 and Japanese Unexamined Patent Application, First Publication No. S62-003037).

In Japanese Patent No. 5571958, a manufacturing method is disclosed in which an apparatus for direction change including a groove into which an optical fiber is introduced and an opening formed in the groove is used. In this method, gas introduced to the apparatus is blown out from the opening through one inflow port, and the direction of the optical fiber is changed in a state where the optical fiber is floated due to the pressure of the gas.

A direction changer disclosed in Japanese Unexamined Patent Application, First Publication No. S62-003037 includes a guide groove which guides a bare optical fiber, and a blowout port for gas which is formed on a lower surface and both side surfaces of the guide groove (refer to Examples, and FIGS. 3A to 4). In the manufacturing method using the direction changer, the direction of the optical fiber is changed in a state where the optical fiber is floated due to the pressure of the gas blown out from four blowout ports.

However, in the manufacturing method described in the above-described Japanese Unexamined Patent Application, it is not easy to stably float the bare optical fiber in a tool for the direction changer.

The present invention has been made in consideration of the above-described circumstances and to provide a method of manufacturing an optical fiber and an apparatus of manufacturing an optical fiber capable of stably floating the bare optical fiber.

SUMMARY OF THE INVENTION

A first aspect of the present invention is a method of manufacturing an optical fiber including, drawing an optical fiber preform and forming a bare optical fiber; disposing a coating layer formed of a resin on the outer circumference of the bare optical fiber; and curing the coating layer and obtaining an optical fiber. A direction of the bare optical fiber is changed by a direction changer in any position from drawing the optical fiber to disposing the coating layer, the direction changer includes a guide groove which guides the bare optical fiber, a blowout port of a fluid which floats the bare optical fiber wired along the guide groove is formed along the guide groove in the guide groove, when a direction of the bare optical fiber is changed by the direction changer, the fluid is introduced into the guide groove from the blowout port and the bare optical fiber is floated and a Reynolds number of the fluid is in a range of 1200-3500, and the Reynolds number in an inlet wire portion of the bare optical fiber to the guide groove and an outlet wire portion from the guide groove is greater than the Reynolds number in an intermediate portion between the inlet wire portion and the outlet wire portion.

In a second aspect of the present invention according to the method of manufacturing an optical fiber of the first aspect described above, the Reynolds number is controlled by measuring a flotation amount of the bare optical fiber is measured and adjusting an introduced flow volume of the fluid to the direction changer based on a measurement value of the flotation amount.

In a third aspect of the present invention according to the method of manufacturing an optical fiber of the first aspect or the second aspect described above, the Reynolds number is adjusted such that a width of the blowout ports in the inlet wire portion and the outlet wire portion is set to be smaller than the blowout port in the intermediate portion.

In a fourth aspect of the present invention according to the method of manufacturing an optical fiber of the first aspect or the second aspect described above, an internal space for transferring the fluid to the blowout port is ensured inside the direction changer, the internal space has a first space which is in communication with the blowout ports in the inlet wire portion and the outlet wire portion and a second space which is in communication with the blowout port in the intermediate portion, and by adjusting an supply of the fluid to the first space and the second space, the Reynolds number of the fluid in the inlet wire portion and the outlet wire portion is set to be greater than the Reynolds number of the fluid in the intermediate portion.

In a fifth aspect of the present invention according to the method of manufacturing an optical fiber of the first aspect or the second aspect described above, an internal space for transferring the fluid to the blowout port is ensured inside the direction changer, the internal space has a first space which is in communication with the blowout port in the inlet wire portion, a second space which is in communication with the blowout port in the intermediate portion, and a third space which is in communication with the blowout port in the outlet wire portion, and by adjusting an supply of the fluid at the first space to the third space, the Reynolds number of the fluid in the inlet wire portion and the outlet wire portion is set to be greater than the Reynolds number of the fluid in the intermediate portion.

In a sixth aspect of the present invention according to the method of manufacturing an optical fiber of the first aspect or the second aspect described above, a narrow portion which is in communication with the blowout ports in the inlet wire portion and the outlet wire portion is formed inside the direction changer, and a pressure loss at the time of blowing out the fluid in the inlet wire portion and the outlet wire portion is greater than the pressure loss in the intermediate portion, thereby, the Reynolds number of the fluid in the inlet wire portion and the outlet wire portion is set to be greater than the Reynolds number of the fluid in the intermediate portion.

A seventh aspect of the present invention is an apparatus of manufacturing an optical fiber including a drawing portion configured to draw an optical fiber perform and form a bare optical fiber, a coating portion configured to dispose a coating layer formed of a resin on an outer circumference of the bare optical fiber, ad a curing portion configured to cure the coating layer. A direction changer which changes a direction of the bare optical fiber is disposed in any position from the drawing portion to the coating portion, the direction changer includes a guide groove which guides the bare optical fiber, a blowout port of a fluid which floats the bare optical fiber wired along the guide groove is formed along the guide groove in the guide groove, and in the blowout port, the Reynolds number in an inlet wire portion of the bare optical fiber to the guide groove and an outlet wire portion from the guide groove is greater than the Reynolds number in an intermediate portion between the inlet wire portion and the outlet wire portion.

In an eighth aspect of the present invention according to the apparatus of manufacturing an optical fiber of the seventh aspect described above, the Reynolds number of the fluid in the inlet wire portion and the outlet wire portion can be set to be greater than the Reynolds number of the fluid in the intermediate portion such that a width of the blowout ports in the inlet wire portion and the outlet wire portion is set to be smaller than the blowout port in the intermediate portion.

In an ninth aspect of the present invention according to the apparatus of manufacturing an optical fiber of the seventh aspect described above, an inner space portion which transports the fluid to the blowout port is ensured inside the direction changer, and the inner space portion can include a first space portion which is in communication with the blowout port of the inlet wire portion and the outlet wire portion, and a second space portion which is in communication with the blowout port of the intermediate portion.

In a tenth aspect of the present invention according to the apparatus of manufacturing an optical fiber of the seventh aspect described above, an inner space portion which transports the fluid to the blowout port is ensured inside the direction changer, and the inner space portion can include a first space portion which is in communication with the blowout port of the inlet wire portion, a second space portion which is in communication with the blowout port of the intermediate portion, and a third space portion which is in communication with the blowout port of the outlet wire portion.

In a eleventh aspect of the present invention according to the apparatus of manufacturing an optical fiber of the seventh aspect described above, a narrow portion which is in communication with the blowout ports in the inlet wire portion and the outlet wire portion is formed inside the direction changer, and a pressure loss at the time of blowing out the fluid in the inlet wire portion and the outlet wire portion is greater than the pressure loss in the intermediate portion, thereby, the Reynolds number of the fluid in the inlet wire portion and the outlet wire portion is set to be greater than the Reynolds number of the fluid in the intermediate portion.

According to the aspects of the present invention described above, when the fluid is introduced into the guide groove from the blowout port of the direction changer to float the bare optical fiber, a Reynolds number of the fluid is in a range of 1200-3500, thereby, it is possible to stably float the bare optical fiber.

DETAILED DESCRIPTION OF THE INVENTION

Figure 1:
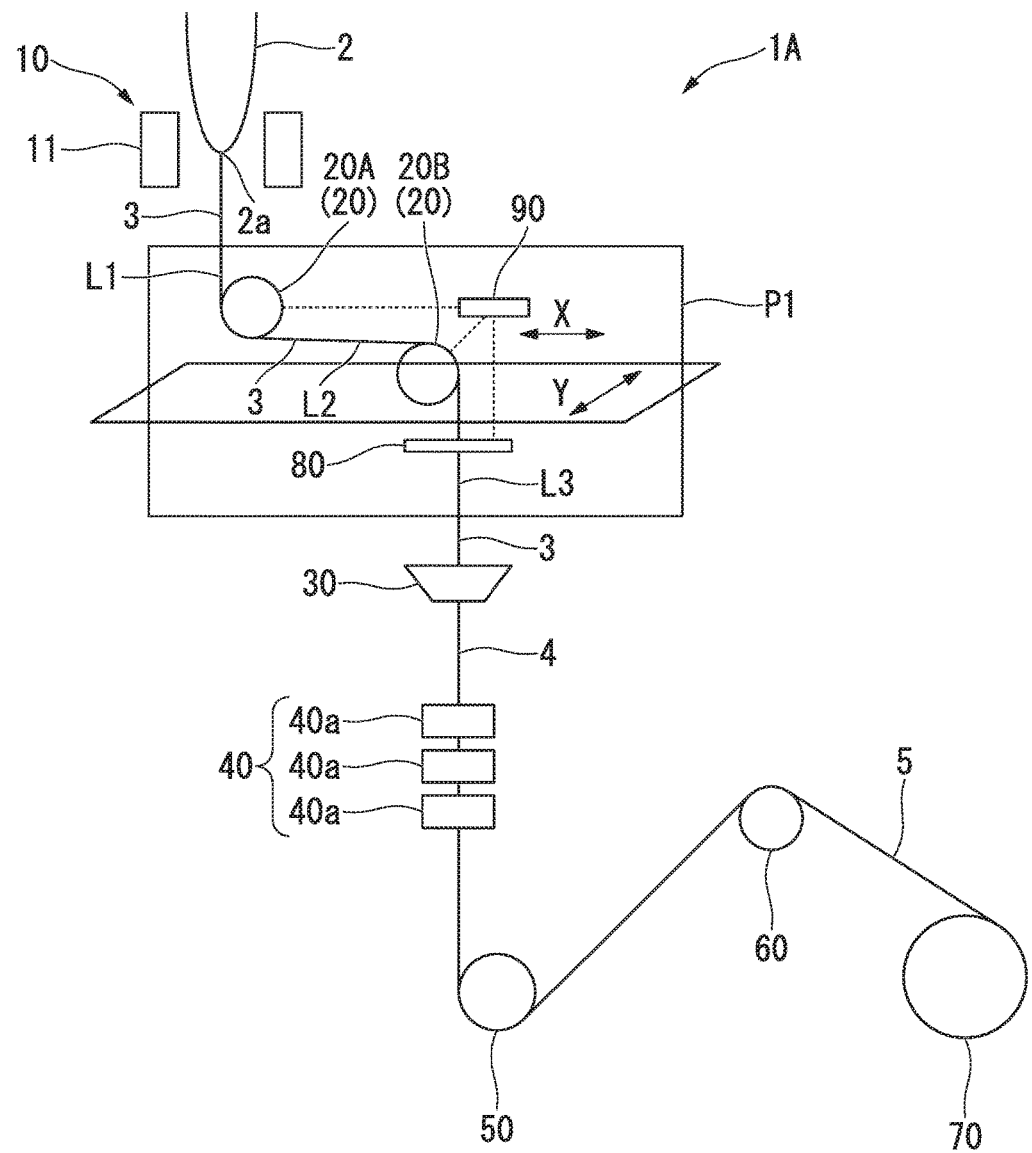
FIG. 1 is a schematic view showing a schematic configuration of a first embodiment of an apparatus of manufacturing an optical fiber.

FIG. 1 is a schematic view showing a schematic configuration of a manufacturing apparatus 1A which is a first embodiment of an apparatus of manufacturing an optical fiber according to the present invention.

The manufacturing apparatus 1A includes a drawing unit 10, direction changers 20 (20A and 20B), a position sensor 80, a coating unit 30, a curing unit 40, and a control unit 90.

A reference numeral "2a" is a tip end portion of a diameter reduced portion (neck-down) of the optical fiber preform 2 which is heated and melted.

The drawing unit 10 includes a heating furnace 11, and forms the bare optical fiber 3 by heating the optical fiber preform 2 using a heating furnace 11 and by drawing the optical fiber preform 2.

The direction changers 20 (20A and 20B) change the direction of the bare optical fiber 3. In the manufacturing apparatus 1A, two direction changers 20 are used. The respective direction changers 20 are referred to as the first direction changer 20A and the second direction changer 20B from upstream to downstream in a drawing direction.

The first direction changer 20A among the two direction changers 20 changes the direction of the bare optical fiber 3 which is drawn out to a vertically downward direction from the optical fiber preform 2 to a horizontal direction, and the second direction changer 20B changes the direction of the bare optical fiber 3 to the vertically downward direction.

The coating unit 30 applies (coats) a coating material such as a urethane acrylate-based resin onto the outer circumference of the bare optical fiber 3 to be the coating layer, and thus obtains the optical fiber intermediary body 4.

The resin coating, for example, is two-layer coating in which a material for a primary coating layer having a low Young's modulus is applied to the inside, and a material for a secondary coating layer having a high Young's modulus is applied to the outside. The used material, for example, is an ultraviolet curing resin.

The coating unit 30 may have a configuration in which the primary coating layer and the secondary coating layer are separately coated, or may have a configuration in which the primary coating layer and the secondary coating layer are simultaneously coated.

The curing unit 40 includes one or a plurality of UV lamps 40a, and forms the optical fiber 5 by curing the coating layer of the optical fiber intermediary body 4. The curing unit 40, for example, includes a plurality of pairs of UV lamps 40a which are disposed by interposing a space therebetween through which the optical fiber intermediary body 4 passes As the position sensor 80, for example, a laser-type position sensor can be employed. The position sensor 80 can detect a position of the bare optical fiber 3. The position sensor 80 can measure a flotation amount of the bare optical fiber 3 at the second direction changer 20B based on the positional information of the bare optical fiber 3.

The position sensor 80 outputs a detection signal to the control unit 90 based on the information regarding the detected position of the bare optical fiber 3.

Although it is not shown, the position sensor for the first direction changer 20A can be disposed at a position between the first direction changer 20A and the second direction changer 20B.

The position sensor can measure a flotation amount of the bare optical fiber 3 at the second direction changer 20A based on the positional information of the bare optical fiber 3.

The position sensor also outputs a detection signal to the control unit 90 based on the information regarding the detected position of the bare optical fiber 3.

The control unit 90 can control the Reynolds number (Re number) at each of the direction changers 20A and 20B by adjusting the introduced flow volume of the fluid flowed to each of the direction changers 20A and 20B based on the detection signal. The control unit 90 can control the introduced flow volume of the fluid by, for example, adjusting an opening degree of an on-off valve provided on an introduction path introducing the fluid to the direction changers 20A and 20B.

The optical fiber 5 changes the direction thereof by a pulley 50 and is taken up by a take-up unit 60 and is wound by winding means 70.

The take-up unit 60, for example, is a take-up capstan, and determines a fiber drawing speed. The fiber drawing speed, for example, is greater than or equal to 1500 m/min.

The winding means 70 is a winding bobbin which winds the optical fiber 5.

An outer diameter of the optical fiber preform 2, for example, is greater than or equal to 100 mm, and the length of the optical fiber 5 prepared from one optical fiber perform 2, and for example, is a few thousand km.

First, the direction will be defined. As shown in FIG. 1, a surface including a linear path line (a first path L1) of the bare optical fiber 3 before being subjected to direction change by the direction changer 20A and a linear path line (a second path L2) of the bare optical fiber 3 after being subjected to the direction change of 90° by the direction changer 20A is referred to as "P1". An X direction is a direction along the second path L2 in the surface P1, and a Y direction is a direction perpendicular to the surface P1.

The optical fiber preform 2 is in a state of being suspended in the vertically downward direction, and the direction of the bare optical fiber 3 which is drawn out from the optical fiber preform 2 is toward a vertically lower portion. For this reason, in the disposition of the first direction changer 20A, accuracy in a disposing position of the direction (the Y direction) perpendicular to the surface P1 including the first path L1 along a vertical direction and the second path L2 along a horizontal direction is important.

Figure 2:
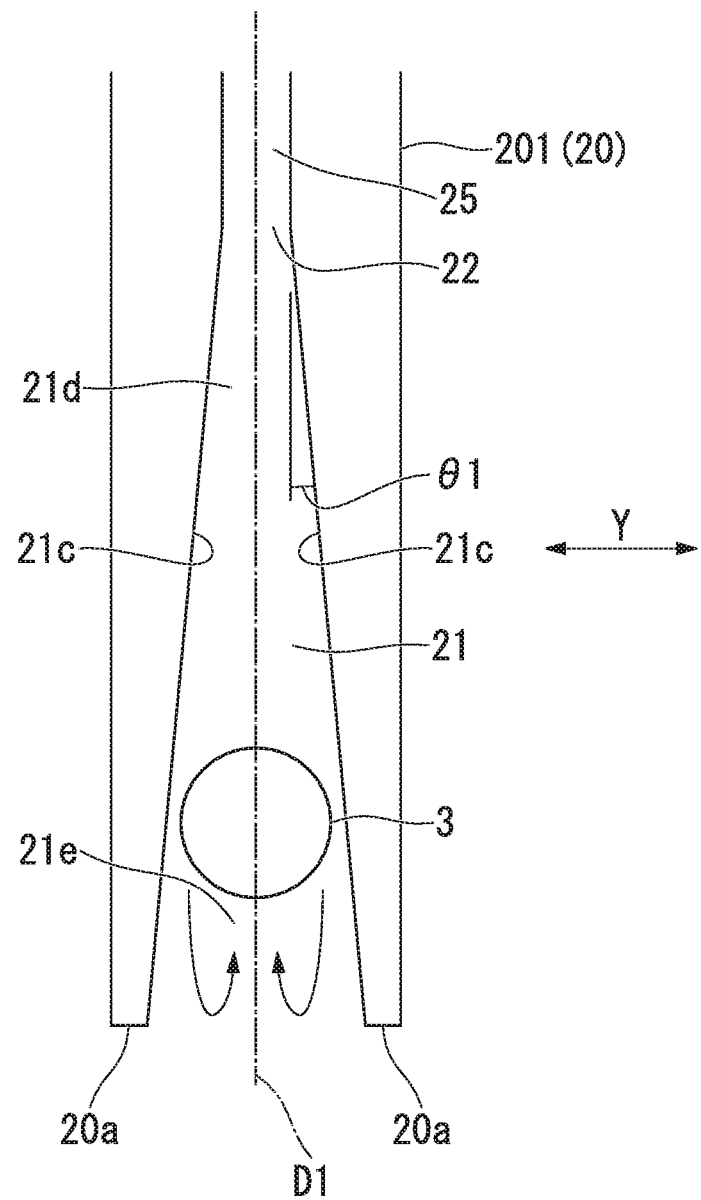
FIG. 2 is a schematic view showing a sectional structure of a direction changer of the manufacturing apparatus shown in FIG. 1.

The reason that accuracy in the positioning of the Y direction is important is because when the bare optical fiber 3 is in contact with an inside surface 21c of the guide groove 21 of the direction changer 20, the strength of the bare optical fiber 3 decreases as shown in FIG. 2, and thus it is necessary to reliably separate the bare optical fiber 3 from the inside surface 21c.

In the manufacturing apparatus 1A, the direction of the bare optical fiber 3 is changed to a third path L3 along the vertical direction by the second direction changer 20B, and thus in the disposition of the second direction changer 20B, accuracy in the disposing position of the direction (the Y direction) perpendicular to the surface P1 including the second path L2 and the third path L3 is required.

The resin coating is generally performed with respect to the vertically downward bare optical fiber, and thus disposition accuracy in the Y direction which is the direction perpendicular to a surface including the path L3 introduced to the coating unit 30 and the path L2 before the direction change is important.

Furthermore, the direction of the bare optical fiber to be subjected to the resin coating is not limited to the vertically downward direction. The direction may be a direction along the second path insofar as the coating can be performed.

Hereinafter, a specific structure of the direction changer 20 will be described.

Figure 3A:
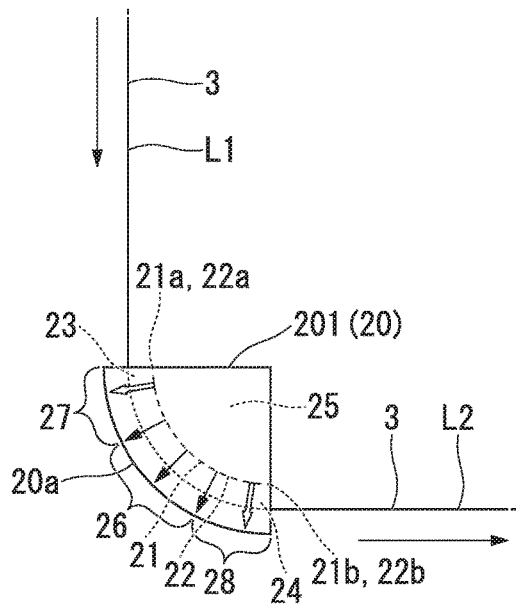
FIG. 3A is a front view showing a first example of the direction changer.

A direction changer 201 shown in FIG. 3A, is a first example of the direction changer 20 and is able to change the direction of the bare optical fiber 3 by 90°. Therefore, the direction changer 201 can be used as the direction changers 20A and 20B shown in FIG. 1.

The direction changer 201 is in the shape of one quarter circle in a plan view, and the guide groove 21 is formed over the entire circumferential length in an outer circumferential surface 20a. The direction changer 201 allows a central axis direction to be coincident with the Y direction, and disposes a radial direction D1 (refer to FIG. 2) in a posture directed towards the direction along the surface P1 (refer to FIG. 1). Here, a direction along the outer circumferential surface 20a which is in the shape of an arc in a plan view is referred to as a circumferential direction.

A blowout port 22 for the fluid (air or the like) which floats the bare optical fiber 3 wired along the guide groove 21 is formed in a lower portion of the guide groove 21 along the guide groove 21. The blowout port 22 is formed over the entire length of the guide groove 21.

As shown in FIG. 2, the direction changer 201 is configured to discharge the fluid (for example, air) in a space (a fluid storing portion 25) ensured in the direction changer 201 into the guide groove 21 through the blowout port 22.

The direction changer 201, for example, can be configured to introduce the fluid to the fluid storing portion 25 from the outside, and to discharge the fluid into the guide groove 21 through the blowout port 22.

It is preferable that the guide groove 21 is formed to be inclined with respect to the radial direction D1 such that a distance between the inside surfaces 21c and 21c (a dimension in the Y direction) gradually increases towards an outer portion in the radial direction. It is preferable that the two inside surfaces 21c and 21c have the same inclination angle θ1 with respect to the radial direction D1.

In the direction changers 20A to 20C, the fluid (for example, air) in the fluid storing portion 25 is discharged into the guide groove 21 through the blowout port 22, and thus it is possible to float the bare optical fiber 3. Specifically, a pressure difference between a deep portion 21d and a shallow portion 21e of the guide groove 21 increases due to the discharged air, and thus the bare optical fiber 3 is floated by applying a force of the outer portion in the radial direction to the bare optical fiber 3.

In the above case, according to conditions, Karman vortex is generated at an outer side in the radial direction to the bare optical fiber 3. When the Karman vortex is generated, pressure fluctuations occur and the bare optical fiber 3 is oscillated. Due to the oscillation, the bare optical fiber 3 is possibly in contact with the inside surface 21c.

The strength of the bare optical fiber 3 may decrease when contacting the inside surface 21c of the guide groove 21, and thus it is necessary to reliably separate the bare optical fiber 3 from the inside surface 21c.

Therefore, the Karman vortex needs to be canceled or to be small enough to reduce the vibration of the bare optical fiber 3.

In the direction changer 201, in order to reduce the Karman vortex, the Re number just before the fluid contacts the bare optical fiber 3 is defined.

The Re number is an index indicating a laminar flow and turbulence of a flow, and when the Re number gets smaller, the flow becomes a laminar flow and less Karman vortex is generated. In contrast, when the Re number gets larger, the flow becomes a laminar flow and more Karman vortex is easily generated.

The Re number does not need to be constant in a circumferential direction of the direction changer 201, and as appropriate, the Re number can be optimized in each of the sections located in different positions in the circumferential direction. Therefore, the oscillation of the bare optical fiber 3 can be reduced.

As to the Re number, it is desirable to optimize values at an inlet wire portion (a portion including a part in which the bare optical fiber 3 moves into the guide groove) and an outlet wire portion (a portion including a part in which the bare optical fiber 3 moves out from guide groove) of the bare optical fiber 3 in the direction changer. Therefore, it is possible to improve the stability of the bare optical fiber 3 when it is floated.

In the direction changer 201 shown in FIG. 3A, the bare optical fiber 3 moves into a first end 21a of the guide groove 21 in the shape of one quarter circle and moves out from a second end 21b, and thus is subjected to the direction change of 90°. An inlet wire portion 23 into which the bare optical fiber 3 moves is a portion including the first end 21a of the guide groove 21, and an outlet wire portion 24 from which the bare optical fiber 3 moves out of is a portion including the second end 21b of the guide groove 21.

Figure 3B:
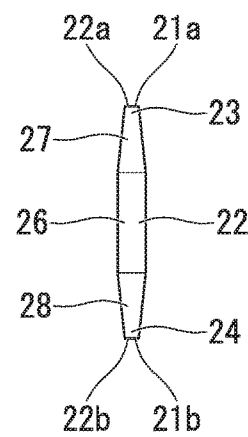
FIG. 3B is a development view showing a blowout port of the direction changer shown in FIG. 3A.

FIG. 3B is a diagram in which the blowout port 22 is developed. As shown in this drawing, the blowout port 22 includes an intermediate portion 26 having a constant width (a constant dimension in the Y direction) over a predetermined length range of the guide groove 21, a first end portion 27 including the first end 22a of the blowout port 22, and a second end portion 28 including the second end 22b of the blowout port 22.

The first end portion 27 extends along the guide groove 21 while the width of the first end portion 27 is narrowed towards the first end 21a of the guide groove 21 from one end of the intermediate portion 26. The second end portion 28 extends along the guide groove 21 while the width of the second end portion 28 is narrowed towards the second end 21b of the guide groove 21 from the other end of the intermediate portion 26.

The first end 22a of the blowout port 22 reaches the first end 21a of the guide groove 21, and the second end 22b reaches the second end 21b.

The first end portion 27 and the second end portion 28, for example, are portions in a circumferential direction range corresponding to 10° to 30°.

In the direction changer 201 shown in FIG. 3A, the first end portion 27 may be in a range in which a position of 0° is a starting end and a position of 10° to 30° is a terminating end in a range of 90°. In addition, the second end portion 28 may be in a range in which a position of 60° to 80° is the starting end and a position of 90° is the terminating end in the range of 90°. In this example, each of the first end portion 27 and the second end portion 28 is in a circumferential direction range corresponding to 11.1% to 33.3% of the entire blowout port 22.

Figure 5A:
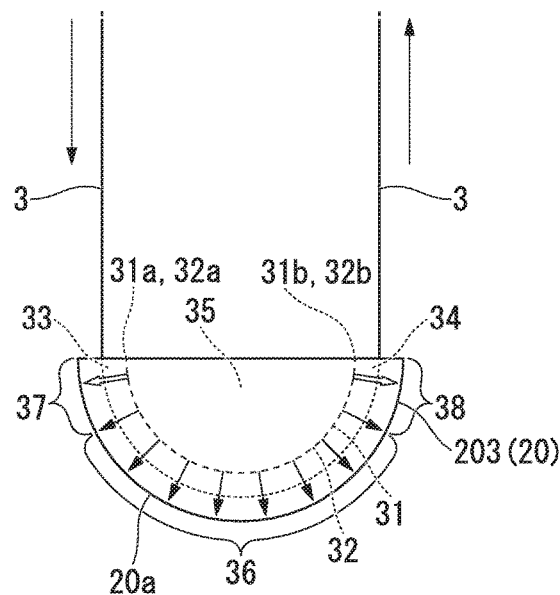
FIG. 5A is a front view showing a second example of the direction changer.

In a direction changer 203 shown in FIG. 5A, a first end portion 37 may be in a range in which a position of 0° is the starting end and a position of 20° to 30° is the terminating end in a range of 180°. In addition, a second end portion 38 may be in a range in which a position of 150° to 160° is the starting end and a position of 180° is the terminating end in the range of 180°. In this example, each of the first end portion 37 and the second end portion 38 is in a circumferential direction range corresponding to 11.1% to 16.7% of the entire blowout port 22.

It is difficult for the first end portion 27 and the second end portion 28 to have a high flow rate in a range close to the first end 21a and the second end 21b, and thus a portion including the first end 21a and the second end 21b may be excluded.

Figure 8:
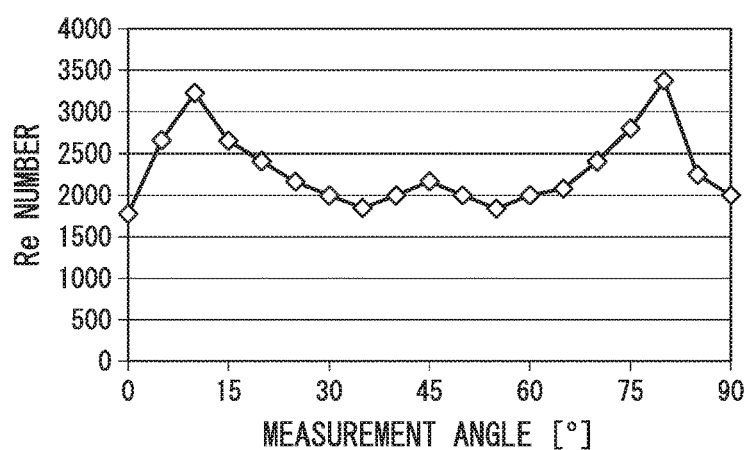
FIG. 8 is a diagram showing a Reynolds-number distribution in a circumferential direction of the direction changer of the first example.

In an example shown in FIG. 8, the first end portion 27 may be a portion excluding a circumferential direction range (in FIG. 8, for example, a range of greater than or equal to 0° and less than 5°) including the first end 21a. In addition, the second end portion 28 may be a portion excluding a circumferential direction range (in FIG. 8, for example, a range of greater than 85° and less than or equal to 90°) including the second end 21b.

That is, the first end portion 27 may be in a range in which a position of 5° is the starting end and a position of 10° to 30° is the terminating end in a range of 90°. In addition, the second end portion 28 may be in a range in which a position of 60° to 80° is the starting end and a position of 85° is the terminating end in the range of 90°.

In this example, each of the first end portion 27 and the second end portion 28 is in a circumferential direction range corresponding to 5.5% to 27.8% of the entire blowout port 22.

Figure 9:
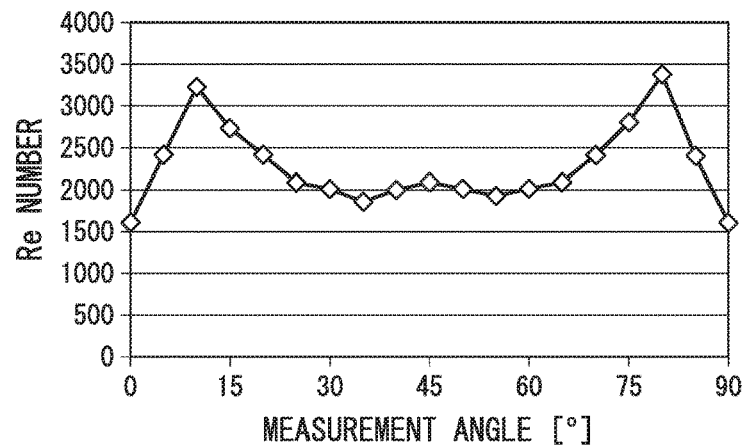
FIG. 9 is a diagram showing a Reynolds-number distribution in a circumferential direction of the direction changer of the second example.

In an example shown in FIG. 9, the first end portion 37 may be a portion excluding a circumferential direction range (in FIG. 9, for example, less than 10°) including a first end 31a. In addition, the second end portion 38 may be a portion excluding a circumferential direction range (in FIG. 9, for example, a range of greater than 170° and less than or equal to 180° including a second end 31b.

That is, the first end portion 37 may be in a range in which a position of 10° is the starting end and a position of 20° to 30° is the terminating end in a range of 180°. In addition, the second end portion 38 may be in a range in which a position of 150° to 160° is the starting end and a position of 170° is the terminating end in the range of 180°.

In this example, each of the first end portion 37 and the second end portion 38 is in a circumferential direction range corresponding to 5.5% to 11.1% of the entire blowout port 22.

It is not possible to comprehensively determine a difference between the minimum width of the first end portion 27 and the second end portion 28 and the width of the intermediate portion 26 since the difference depends on other designs, but the difference is at least on the order of a few μm to a few dozen μm.

A difference between the minimum width of the first end portion 27 and the second end portion 28, and the width of the intermediate portion 26, for example, is able to be 2 μm to 10 μm. By setting the difference to be in the range described above, it is possible to ensure the blowing-out flow rate of the fluid in the first end portion 27 and the second end portion 28, and it is possible to increase a ratio of the blowing-out flow rate in the first end portion 27 and the second end portion 28 to the blowing-out flow rate in the intermediate portion 26.

It is preferable that the maximum width of the first end portion 27 and the second end portion 28 and the width of the intermediate portion 26 are equal to each other.

The minimum width of the first end portion 27 and the second end portion 28 can be 70% to 98% with respect to the width of the intermediate portion 26. The minimum width of the first end portion 27 and the second end portion 28 is preferably 80% to 95%, and is more preferably 85% to 90%, with respect to the width of the intermediate portion 26.

By setting the ratio of the minimum width of the first end portion 27 and the second end portion 28 to the width of the intermediate portion 26 to be in the range described above, it is possible to ensure the blowing-out flow rate of the fluid in the first end portion 27 and the second end portion 28, and it is possible to increase a ratio of the blowing-out flow rate in the first end portion 27 and the second end portion 28 to the blowing-out flow rate in the intermediate portion 26.

Furthermore, in the first end portion 27, the second end portion 28, and the intermediate portion 26 shown in FIG. 3B, both side edges are linear, and when the width of the first end portion 27, the second end portion 28, and the intermediate portion 26 is narrowed towards the first end 21a and the second end 21b, both of the side edges may be curved.

In the direction changer 201 shown in FIGS. 3A, 3B, The width of the first end portion 27 and the second end portion 28 (for example, an average width or the minimum width) is narrowed, and thus the width of the blowout port 22 is narrowed in the inlet wire portion 23 and the outlet wire portion 24 which are both end portions of the guide groove 21.

For this reason, in the inlet wire portion 23 and the outlet wire portion 24, a pressure loss at the time of blowing out the fluid from the blowout port 22 increases compared to the other portion (in this example, a portion between the inlet wire portion 23 and the outlet wire portion 24, that is, a portion in a length range corresponding to the intermediate portion 26), and thus the blowing-out flow rate in the inlet wire portion 23 and the outlet wire portion 24 is faster than the lowest flow rate of the fluid in the other portion.

The blowing-out flow rate of the fluid in the inlet wire portion 23 and the outlet wire portion 24 may be faster than an average flow rate (or the highest flow rate) of the fluid in the intermediate portion 26.

In comparison to the flow rate of the fluid in the intermediate portion 26, the flow rate of the fluid in the inlet wire portion 23 and the outlet wire portion 24 is the average value or the highest value.

Since the blowing-out flow rate of the fluid increases at the inlet wire portion 23 and the outlet wire portion 24, the Re number increases compared to the other portion (in this example, a portion including a length corresponding to the intermediate portion 26).

Figure 4:
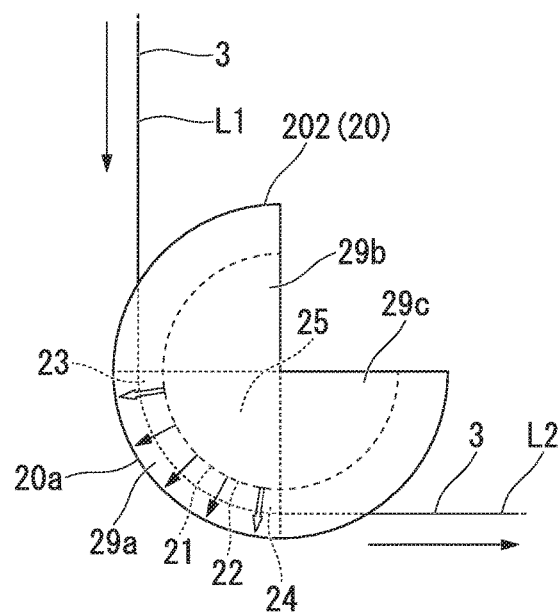
FIG. 4 is a front view showing a modification example of the direction changer of the first example shown in FIGS. 3A and 3B.

A direction changer 202 shown in FIG. 4 is a modification example of the direction changer 201, and is in the shape of a three-quarter circle in a plan view. Hereinafter, the same reference numerals are applied to configurations identical to the configurations described above, and the description thereof will be omitted.

The direction changer 202 has a structure in which on an incoming line side and an outgoing line side of a main body portion 29a having the same structure as that of the direction changer 201 shown in FIG. 3A, auxiliary portions 29b and 29c respectively having the same structure as that of the main body portion 29a are continuously disposed.

The direction changer 202 has a basic function identical to that of the direction changer 201 since the bare optical fiber 3 moves into the guide groove 21 of the main body portion 29a from the inlet wire portion 23, and moves out through the outlet wire portion 24 after the direction thereof is changed by 90° in the main body portion 29a.

The direction changers 201 and 202 are able to change the direction of the bare optical fiber 3 by 90°, and thus are able to be used as the direction changers 20A and 20B shown in FIG. 1.

The direction changer 203 shown in FIG. 5A is a second example of the direction changer 20, and is able to change the direction of the bare optical fiber 3 by 180°. The direction changer 203 is in the shape of a semicircle in a plan view, and a guide groove 31 is formed over the entire circumferential length in the outer circumferential surface 20a.

A blowout port 32 of the fluid (air or the like) which floats the bare optical fiber 3 is formed in a lower portion of the guide groove 31 along the guide groove 31. The blowout port 32 is formed over the entire length of the guide groove 31.

The direction changer 203 is configured to discharge the fluid in the guide groove 31 from the fluid storing portion 35 through the blowout port 32.

In the direction changer 203, the bare optical fiber 3 moves into a first end 31a of the guide groove 31 which is in the shape of a semicircle, and is subjected to direction change of 180° by moving out from a second end 31b. An inlet wire portion 33 is a portion including the first end 31a of the guide groove 31, and an outlet wire portion 34 is a portion including the second end 31b of the guide groove 31.

The sectional shape of the guide groove 31 is the same as the sectional shape of the guide groove 21 (refer to FIG. 2).

Figure 5B:
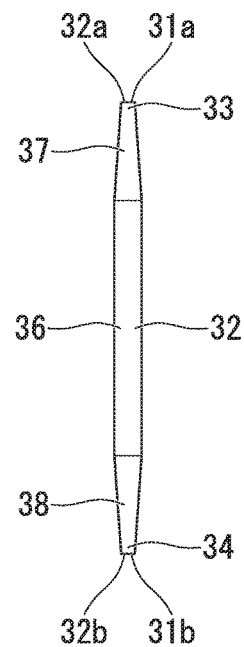
FIG. 5B is a development view showing a blowout port of the direction changer shown in FIG. 5A.

As shown in FIG. 5B, the blowout port 32 includes an intermediate portion 36 having a constant width (a constant dimension in the Y direction) over a predetermined length range of the guide groove 31, a first end portion 37 including the first end 32a of the blowout port 32, and a second end portion 38 including the second end 32b of the blowout port 32.

The first end portion 37 extends along the guide groove 31 while the width of the first end portion 37 is narrowed towards the first end 31a of the guide groove 31 from one end of the intermediate portion 36. The second end portion 38 extends along the guide groove 31 while the width of the second end portion 38 is narrowed towards the second end 31b of the guide groove 31 from the other end of the intermediate portion 36.

The first end 32a of the blowout port 32 reaches the first end 31a of the guide groove 31, and the second end 32b reaches the second end 31b.

The width of the first end portion 37 and the second end portion 38 (for example, an average width or the minimum width) is narrowed, and thus the width of the blowout port 32 is narrowed in the inlet wire portion 33 and the outlet wire portion 34 which are both end portions of the guide groove 31.

For this reason, in the inlet wire portion 33 and the outlet wire portion 34, the blowing-out flow rate of the fluid from the blowout port 32 is faster than the lowest flow rate of the fluid in the other portion (an intermediate portion 36).

The blowing-out flow rate of the fluid in the inlet wire portion 33 and the outlet wire portion 34 may be faster than an average flow rate (or the highest flow rate) of the fluid in the intermediate portion 36.

Since the blowing-out flow rate of the fluid increases at the inlet wire portion 33 and the outlet wire portion 34, the Re number increases compared to the other portion (in this example, a portion including a length corresponding to the intermediate portion 36).

Figure 6:
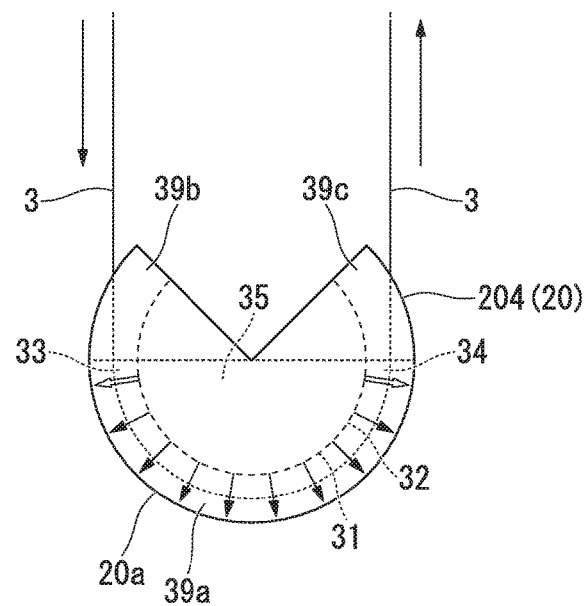
FIG. 6 is a front view showing a modification example of the direction changer of the first example shown in FIGS. 5A and 5B.

A direction changer 204 shown in FIG. 6 is a modification example of the direction changer 203, and is in the shape of a three-quarter circle in a plan view.

The direction changer 204 has a structure in which on an incoming line side and an outgoing line side of a main body portion 39a having the same structure as that of the direction changer 203 shown in FIG. 5A, auxiliary portions 39b and 39c respectively having the same sectional structure as that of the main body portion 39a which are in the shape of an eighth circle in a plan view are continuously disposed.

The direction changer 204 has a basic function identical to that of the direction changer 203 since the bare optical fiber 3 moves into the guide groove 31 of the main body portion 39a from the inlet wire portion 33, and moves out through the outlet wire portion 34 after the direction thereof is changed by 180° in the main body portion 39a.

Next, a first embodiment of a manufacturing method of an optical fiber of the present invention will be described by using a case where the manufacturing apparatus 1A is used as an example.

(Drawing Step)

In the drawing unit 10, the optical fiber preform 2 is heated and drawn, and thus the bare optical fiber 3 is formed.

(Direction Change of Direction Changer)

The bare optical fiber 3 which is drawn out to the vertically downward direction (the first path L1) from the optical fiber preform 2 is directed towards a horizontal direction (the second path L2) due to direction change of 90° of the first direction changer 20A.

The bare optical fiber 3 is directed towards the vertically downward direction (the third path L3) due to direction change of 90° of the second direction changer 20B.

In the direction changers 20A and 20B, the fluid (for example, air) in the fluid storing portion 25 is discharged into the guide groove 21 through the blowout port 22, and thus it is possible to float the bare optical fiber 3. Specifically, a pressure difference between the deep portion 21d and the shallow portion 21e of the guide groove 21 increases due to the discharged air, and thus the bare optical fiber 3 is floated by applying a force of the outer portion in the radial direction to the bare optical fiber 3.

The position sensor 80 outputs a detection signal to the control unit 90 based on the information regarding the detected position of the bare optical fiber 3.

The control unit 90 controls the introduced flow volume of the fluid flowed to each of the direction changers 20A and 20B based on the detected signal. The control unit 90 can control the introduced flow volume of the fluid by, for example, adjusting an opening degree of an on-off valve provided on an introduction path introducing the fluid to the direction changers 20A and 20B.

In particular, the control unit 90 controls the introduced flow volume of the fluid to be decreased when the flotation amount of the bare optical fiber 3 increases. As a result, the Re numbers at the direction changers 20A and 20B are decreased. The control unit 90 controls the introduced flow volume of the fluid to be increased when the flotation amount of the bare optical fiber 3 decreases. Therefore, the Re number at each of the direction changers 20A and 20B increases.

As a control method, a feedback controller such as a proportional-integral-derivative (PID) controller is preferable. Therefore, the introduced flow volume of the fluid can be controlled with satisfactory responsiveness The position sensor for the first direction changer 20A can be disposed at a position between the first direction changer 20A and the second direction changer 20B. In this case, the flotation amount of the bare optical fiber 3 at the first direction changer 20A is measured based on the positional information of the bare optical fiber 3 obtained at this position sensor. Based on the measurement results thereof, the control unit 90 can control the Re number of the first direction changer 20A.

In this case, the control of the Re number at the second direction changer 20B is performed based on the positional information of the bare optical fiber 3 obtained at the position sensor 80. In particular, the flotation amount of the bare optical fiber 3 at the second direction changers 20B is measured based on the information obtained at the position sensor 80. Based on the measurement results, the control unit 90 controls the Re number of the second direction changer 20B.

(Coating Step)

In the coating unit 30, the coating material such as a urethane acrylate-based resin is applied (coated) onto the outer circumference of the bare optical fiber 3 and becomes the coating layer, and thus the optical fiber intermediary body 4 is obtained.

(Curing Step)

In the curing unit 40, the coating layer of the optical fiber intermediary body 4 is cured by irradiation of a UV lamp 40a, and the optical fiber 5 is formed.

The optical fiber 5 is wound by the winding means 70 through the pulley 50 and the take-up unit 60.

As shown in FIG. 2, the flotation amount of the bare optical fiber 3 inside the guide groove 21 depends on the flow rate of the fluid.

The inside surfaces 21c, 21c are inclined such that a width gradually increases towards an outer portion in the radial direction. Therefore, when the flotation amount of the bare optical fiber 3 increases, a gap between the bare optical fiber 3 and the inside surface 21c increases, and the contact between the bare optical fiber 3 and the inside surface 21c hardly occurs.

However, practically, when the flotation amount of the bare optical fiber 3 increases, the strength of the bare optical fiber 3 often decreases and the cause thereof is estimated as the contact between the bare optical fiber 3 and the inside surface 21c.

The inventors of the present application found the followings after consideration of causes and solutions of the above phenomenon.

In the guide groove 21, by setting the Re number of the fluid flow just before the bare optical fiber 3 to be 1200-3500, floatation of the bare optical fiber 3 can be stabilized.

When the Re number exceeds 3500, due to pressure fluctuations which is likely to be caused by an influence of Karman vortex of the fluid flow generated in the rear of the bare optical fiber 3, the flotation amount of the bare optical fiber 3 changes (temporal oscillation or fluctuation of the flotation amount of the bare optical fiber 3) occurs.

Due to the variation of the flotation amount, the bare optical fiber 3 is in contact with the inside surfaces 21c, 21c with some frequencies, and the strength of the optical fiber 5 may decrease by the contact.

Figure 7:
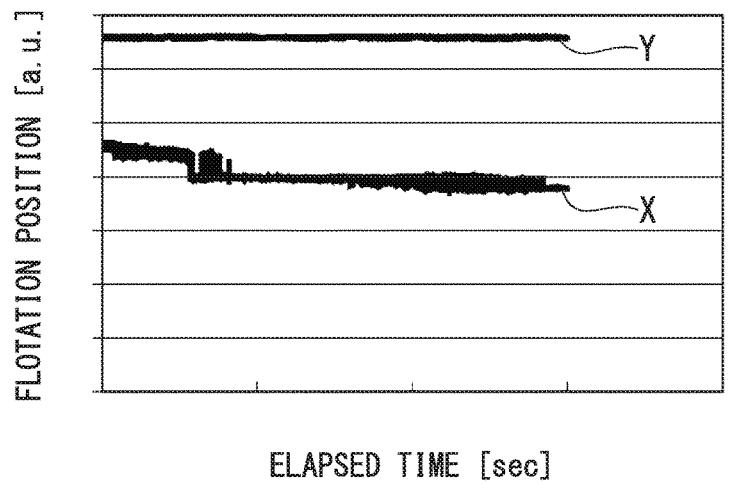
FIG. 7 is a diagram showing an example of fluctuation of a flotation position.

FIG. 7 is a diagram showing an example of fluctuation of a flotation position.

Regarding the flotation amount, the manufacturing apparatus 1A of the bare optical fiber shown in FIG. 1 is used and positional data of the bare optical fiber 3 is obtained by the position sensor 80 disposed at a position between the direction changer 20B and the coating unit 30 (the third path L3).

With reference to FIG. 7, it is found that a flotation position of a component in an X-direction fluctuates much greater than a flotation position of a component in a Y-direction as the time elapses. It appears that a position in the Y-direction is stable; however, the fluctuation of the flotation position is approximately ±10 µm. Usually, since a gap between the bare optical fiber 3 and an inside surface 21c of the guide groove 21 is a few tens µm, the fluctuation of the flotation position in the Y-direction is not also a small fluctuation.

When the Re number is under 1200, the fluid flow becomes almost like a laminar flow. However, since a fluid-flow rate is slow, a sufficient flotation amount of the bare optical fiber 3, due to the variation of the drawing tension, the flotation position of the bare optical fiber 3 is shifted in a depth direction of the guide groove 21 and the bare optical fiber 3 contacts the surface 21c. As a result, the strength of the bare optical fiber 3 is decreased.

In contrast, when the Re number of the fluid flow is 1200-3500, a certain amount of flotation amount of the bare optical fiber 3 is secured and the temporal stability of the flotation amount is obtained, and drawing can be performed without causing products to include a serious defect.

A Re number at the direction changer 20 can be calculated as shown below.

Re number=density of gas to be used [kg/m³]×fluid-flow rate [m/sec]×representative length [m]/ viscosity of gas to be used [Pa·s]

Regarding a representative length, since the inclination of the inside surfaces 21c, 21c is very small, the inside surface 21c, 21c is assumed to be parallel each other, and a representative length between the two plates.

Here, the Re number is introduced as an index to represent stability of the flotation amount. Therefore, the Re number does not need to be strictly precise, and an upper-class index is used. In other words, when a distance between the two plates is d [m], the representative length is set 2d [m].

In addition, with regard to the fluid-flow rate [m/sec], a measurement position is at a bottom side of the guide groove 21 in a turning position of the bare optical fiber 3. For example, a fluid-flow position is follows: fluid-flow position=turning radius (center position of the bare optical fiber 3)−radius of the bare optical fiber 3. An outer diameter of the bare optical fiber 3 is, for example, 125 µm.

A cross-section of the guide groove 21 at this position is calculated, and based on an introduced flow volume [m³/sec] of the fluid to a direction changer 20 as follows, fluid-flow rate [m/sec]=introduced flow volume [m³/sec]/cross-section of fluid passage [m²], the fluid-flow rate is calculated.

Here, in the density of gas to be used and the viscosity of gas to be used, values at a temperature of used gas to be used (generally, a normal temperature and approximately 20° C.) are employed.

As a specific structure of the direction changer, for example, structures which are described in Japanese Patent No. 5571958 or Japanese Unexamined Patent Application, First Publication No. S62-003037 can be used. The structure of the direction changer 20 is not particularly limited to these two structures, and other structures may be used.

For example, when a non-contact retaining mechanism described in Japanese Patent No. 5571958 is used, in the direction changer, a direction of the bare optical fiber 3 is changed by 90° at the turning radius of 62.5 mm. A width of the guide groove 21 (i.e., the width of the guide groove 21 at a position of an innermost periphery of the bare optical fiber 3 in a floating state) is 145 μm. A diameter of the bare optical fiber 3 is 125 μm. An introduced flow volume of the air is 100 L/min with respect to the direction changer.

The turning radius is determined by a relation between a fluid-flow rate and drawing tension. Here, the turning radius is a radius when a certain drawing tension is set under a structure or a manufacturing condition of a specific direction changer.

Fluid-flow position=$62.5\times10^{-3}$–$62.5\times10^{-6}$=0.0624375 m

Cross-section of fluid passage=$2\times\pi\times$Fluid-flow position$\times90/360\times$a groove width=$1.42211\times10^{-5}$ m Fluid-flow rate=Introduced flow volume/Fluid-flow position=$100\times10^{-3}/60$/cross-section of fluid passage≈117.2 m/sec Density of air (20° C.)=1.205 kg/m$^3$ Viscosity of air (20° C.)=$1.822\times10^{-5}$ Pa·s Representative length=a groove width$\times2$=$145\times10^{-6}\times2$=0.00029 m Re number≈2248

Since the Re number falls into a range of 1200 to 3500, the above conditions can be determined as the conditions in a stable state.

In addition, the Re number of the fluid flow does not need to be constant at the entire circumferential direction (the entire blowout port) of the direction changer 20, and as appropriate, the Re number can be optimized in each of the sections located in different positions in the circumferential direction.

For example, an inlet wire position and an outlet wire position of the bare optical fiber 3 to and from the direction changer 20 are on a contact interface of the bare optical fiber 3 and the fluid flow. The contact interface is an interface between a portion where the bare optical fiber 3 contacts the fluid flow and a portion where the bare optical fiber 3 does not contact the fluid flow.

Furthermore, it is necessary to correct the positional shift between a tip end portion of the optical fiber at the manufacturing apparatus 1A and the direction changer 20 (center shift) by the fluid flow in any way. Therefore, in addition to a condition to obtain stability of the floatation amount at a normal portion excluding an incoming line position and an outgoing line position, a condition for correct the positional shift needs to be added.

For example, in FIG. 1, the optical fiber cannot be moved in a radial direction, and thus the a tip end portion 2a of a diameter reduced portion (neck-down) of the optical fiber preform 2 which is heated and melted, the coating unit 30, the take-up unit 60, the pulley 50, and the winding means 70 are able to act as a fixed end when the optical fiber is horizontally oscillated.

Regarding the direction changer 20, in order to correct a positional shift of a path line of the bare optical fiber 3, it is desirable to increase the flotation amount in the inlet wire portion 23 and the outlet wire portion 24.

Therefore, as shown in FIG. 8, the Re number is adjusted to a large value as long as there is no influence of Karman vortex. In other words, the Re number is preferable to be at least in a range of 2500-3500.

As a result, the oscillation of the bare optical fiber 3 can be decreased, and also the flotation stability in the inlet wire portion 23 and the outlet wire portion 24 of the direction changer 20 can be obtained. In addition, a large allowable range of a positional correction in the inlet wire portion 23 and the outlet wire portion 24 can be secured. Accordingly, the decrease of the strength of the bare optical fiber 3 due to the contact between the bare optical fiber 3 and the inside surface 21c, 21c can be reduced.

In order to increase the flotation amounts at the inlet wire portion 23 and the outlet wire portion 24, the Re number is set greater than the Re number at the other portion (in this example, a portion between the inlet wire portion 23 and the outlet wire portion 24, that is, a portion in a length range corresponding to the intermediate portion 26).

In the direction changer 201 shown in FIGS. 3A and 3B, the width of the first end portion 27 and the second end portion 28 (for example, an average width or the minimum width) is narrowed, and thus the width of the blowout port 22 is narrowed in the inlet wire portion 23 and the outlet wire portion 24 which are both end portions of the guide groove 21.

For this reason, in the inlet wire portion 23 and the outlet wire portion 24, a pressure loss at the time of blowing out the fluid from the blowout port 22 increases compared to the other portion (in this example, a portion between the inlet wire portion 23 and the outlet wire portion 24, that is, a portion in a length range corresponding to the intermediate portion 26), and thus the blowing-out flow rate in the inlet wire portion 23 and the outlet wire portion 24 is faster than the lowest flow rate of the fluid in the other portion.

The blowing-out flow rate of the fluid in the inlet wire portion 23 and the outlet wire portion 24 may be faster than an average flow rate (or the highest flow rate) of the fluid in the intermediate portion 26.

Therefore, the Re number at the inlet wire portion 23 and the outlet wire portion 24 can be greater than the Re number at the other portion (in this example, a portion including a length corresponding to the intermediate portion 26).

As described above, the flow rate of the fluid increases in the inlet wire portion 23 and the outlet wire portion 24, and thus a pressure difference between a deep portion 21d (see FIG. 2) and a shallow portion 21e of the guide groove 21 increases, a force in a direction (an outer portion in a radial direction) in which the bare optical fiber 3 is floated increases due to Bernoulli effect. In addition, based on the Navier-Stokes principle considering viscosity, an effect positioning the bare optical fiber 3 closer to a center of the guide groove 21 (a center in the Y-direction) increases. For this reason, a shift in a path line position is corrected.

In addition, a flotation amount of the bare optical fiber 3 increases in the inlet wire portion 23 and the outlet wire portion 24. Thus, a gap between an inside surface 21c of the guide groove 21 and the bare optical fiber 3 is widened, and an acceptable amount with respect to the shift in the path line position increases.

For this reason, it is possible to relax a requirement for accuracy in a disposing position of the direction changer 20. For example, it is possible to set disposing position required accuracy to be on a μm-order to 0.5 mm order (a few hundred μm order), and it is possible to relax a requirement for accuracy of at least a few hundred times.

Accordingly, a disposing operation of the direction changer 20 becomes easy, and damage which is caused by bringing the bare optical fiber 3 in contact with the inside surface 21c of the guide groove 21 is prevented, and thus it is possible to manufacture the optical fiber 5 with a sufficient yield.

Further, it is possible to adjust the blowing-out flow rate of the fluid in the inlet wire portion 23, the outlet wire portion 24, and the intermediate portion 26. Thus it is possible to ensure the blowing-out flow rate of the fluid for floating the bare optical fiber 3 in the intermediate portion 26. In addition, it is possible to set a sufficient blowing-out flow rate of the fluid for adjusting the path line position in the inlet wire portion 23 and the outlet wire portion 24 and for adjusting the flotation amount of the bare optical fiber 3. Accordingly, it is possible to reduce the operating cost without wasting the fluid.

Regarding an adjustment of an installing position of the direction changers 20A and 20B with respect to the X-direction, the same accuracy as in the Y-direction is not necessary. It is because that regarding the X-direction, for example, a flotation position of the bare optical fiber is finely adjustable by adjusting the number in a range of 1200-3500.

Therefore, in the X-direction, if disposition accuracy is in a range capable of ensuring the stability of the flotation amount of the bare optical fiber 3 by at least adjusting the blowing-out flow rate of the fluid, the disposition accuracy may be low compared to the disposition accuracy in the Y-direction. In other words, it is desirable that if it can be avoided a state that the bare optical fiber 3 does not float as a result of decreasing the Re number by reducing the blowing-out flow rate of the fluid in order to adjust a position in an X-direction.

FIG. 8 shows an Re number distribution in a circumferential direction of the direction changer 201 (refer to FIGS. 3A and 3B) which changes the direction of the bare optical fiber 3 by 90°. FIG. 9 shows an Re number distribution in a circumferential direction of the direction changer 203 (refer to FIGS. 5A and 5B) which changes the direction of the bare optical fiber 3 by 180°. In the measurement, a wind gauge SAV-26A manufactured by Kansai Tech Co., Ltd. is used, but the wind gauge is not particularly limited. The amount of the fluid (air) introduced to the direction changer 201 is suitably adjusted such that the amount does not exceed a measurement upper limit of the wind gauge. Here, based on the measured wind-speed distribution, the distribution is converted to a wind speed at a position where the Re number is calculated and regarded as the actual introduced flow volume of the fluid, and converted to an Re-number distribution.

As shown in FIG. 8, in the direction changer 201 (refer to FIGS. 3A and 3B) which changes the direction of the bare optical fiber 3 by 90°, the measurement is performed at a plurality of positions in the circumferential direction every 5°. In this example, a position of 0° is an incoming line position, and a position of 90° is an outgoing line position.

As shown in this drawing, the Re number is maximized in a position close to the incoming line position and the outgoing line position (a position of 10° and 80°), and the Re number is minimized in a position separated from the incoming line position and the outgoing line position (a position of 35° and 55°).

The Re number in a position of 10° is the highest value of the blowing-out Re number of the fluid in the inlet wire portion 23 of the direction changer 201 (refer to FIGS. 3A and 3B). The wind speed in a position of 80° is the highest value of the blowing-out Re number of the fluid in the outlet wire portion 24 of the direction changer 201.

The Re number in a position of 35° and 55° is the lowest value of the blowing-out Re number of the fluid in the intermediate portion 26 of the direction changer 201.

The blowing-out Re number (the highest value) in the inlet wire portion 23 and the outlet wire portion 24 is approximately 1.8 times the lowest value of the blowing-out Re number in the intermediate portion 26.

As shown in FIG. 9, in the direction changer 203 (refer to FIGS. 5A and 5B) which changes the direction of the bare optical fiber 3 by 180°, the measurement is performed at a plurality of positions in the circumferential direction every 10°. In this example, a position of 0° is an incoming line position, and a position of 180° is an outgoing line position.

As shown in this drawing, the Re number is maximized in a position close to the incoming line position and the outgoing line position (a position of 20° and 160°), and the Re number is minimized in a position separated from the incoming line position and the outgoing line position (a position of 70°).

The Re number in a position of 20° is the highest value of the blowing-out flow rate of the fluid in the inlet wire portion 33 of the direction changer 203 (refer to FIGS. 5A and 5B). The Re number in a position of 160° is the highest value of the blowing-out flow rate of the fluid in the outlet wire portion 34 of the direction changer 203.

The Re number in a position of 70° is the lowest value of the blowing-out Re number of the fluid in the intermediate portion 36 of the direction changer 203.

The blowing-out Re number (the highest value) in the inlet wire portion 33 and the outlet wire portion 34 is approximately 1.8 times the lowest value of the blowing-out Re number in the intermediate portion 36.

Hereinafter, practically, a concrete method setting the Re numbers so that the numbers are different in each of the plurality of areas in a circumferential direction is described.

1. Adjusting Re Number by Adjusting Width of Blowout Port 22

In the direction changer 201 shown in FIGS. 3A and 3B, the width of the first end portion 27 and the second end portion 28 (for example, an average width or the minimum width) is narrowed, and thus the width of the blowout port 22 is narrowed in the inlet wire portion 23 and the outlet wire portion 24 which are both end portions of the guide groove 21.

For this reason, in the inlet wire portion 23 and the outlet wire portion 24, a pressure loss at the time of blowing out the fluid from the blowout port 22 increases compared to the other portion (in this example, a portion between the inlet wire portion 23 and the outlet wire portion 24, that is, a portion in a length range corresponding to the intermediate portion 26), and thus the blowing-out flow rate in the inlet wire portion 23 and the outlet wire portion 24 is faster than the lowest flow rate of the fluid in the other portion.

As shown in FIG. 8, at the inlet wire portion 23 and the outlet wire portion 24, the blowing-out flow rate of the fluid becomes faster, the Re numbers increase compared to the another portion (in this example, a portion having a length range corresponding to the intermediate portion 26).

2. Adjusting Re Number by Providing Multiple Inner Spaces

Figure 10:
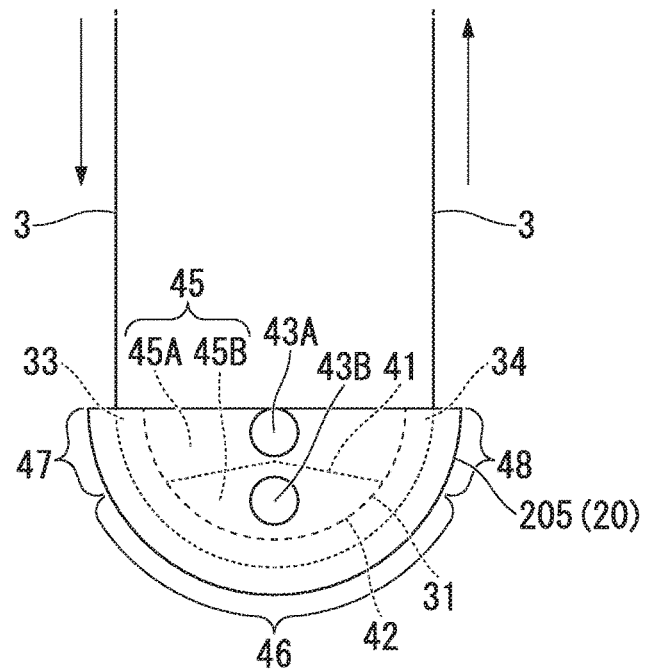
FIG. 10 is a front view showing a third example of the direction changer.

The direction changer 205 shown in FIG. 10 is a third example of the direction changer 20, and is able to change the direction of the bare optical fiber 3 by 180°. The direction changer 205 is in the shape of a semicircle in a plan view, and is configured to discharge the fluid in the guide groove 31 from a fluid storing portion 45 through a blowout port 42.

The shape of the blowout port 42 is not particularly limited, and for example, the width may be constant over the length direction of the guide groove 31.

The fluid storing portion 45 is partitioned into a first fluid storing portion 45A (a first space) and a second fluid storing portion 45B (a second space) by the partition wall 41.

The first fluid storing portion 45A is in communication with a first end portion 47 and a second end portion 48 of the blowout port 42, and the second fluid storing portion 45B is in communication with an intermediate portion 46 of the blowout port 42.

A first supply port 43A which supplies the fluid to the first fluid storing portion 45A and a second supply port 43B which supplies the fluid to the second fluid storing portion 45B are formed on a side surface of the direction changer 205.

In the direction changer 205, a flow volume of the fluid supplied to the fluid storing portions 45A and 45B through the supply ports 43A and 43B is adjusted, and thus it is possible to set inner pressures of the fluid storing portions 45A and 45B to be independent from each other. For this reason, it is possible to set the blowing-out flow rate of the fluid in the first end portion 47 and the second end portion 48 and the blowing-out flow rate of the fluid in the intermediate portion 46 to be independent from each other.

For this reason, it is possible to set the blowing-out flow rate of the fluid in the inlet wire portion 33 and the outlet wire portion 34 to be faster than the lowest blowing-out flow rate of the fluid in the other portion in circumferential direction (the intermediate portion 46).

Since the blowing out flow rate of the fluid becomes fast at the inlet wire portion 33 and the outlet wire portion 34, an Re number thereof becomes faster than an Re number at the other portion (the intermediate portion 46) in the circumferential direction.

Figure 11:
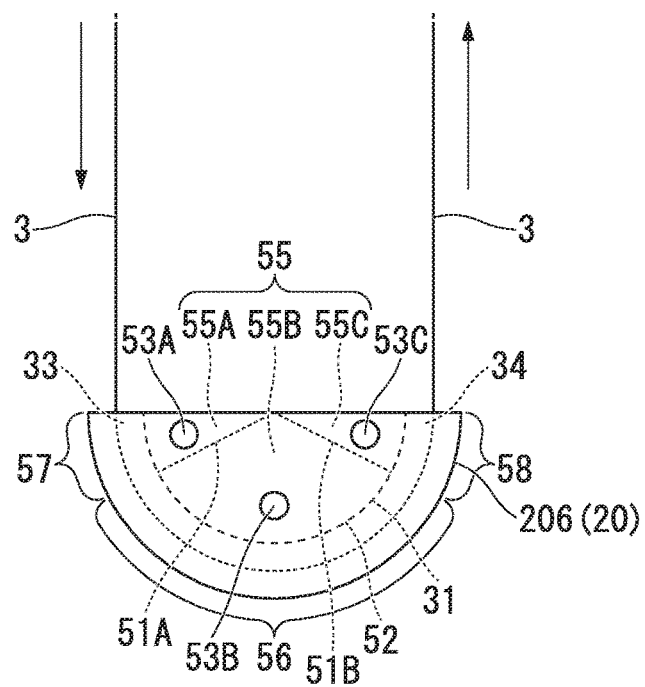
FIG. 11 is a front view showing a fourth example of the direction changer.

A direction changer 206 shown in FIG. 11 is a fourth example of the direction changer 20, and is able to change the direction of the bare optical fiber 3 by 180°. The direction changer 206 is in the shape of a semicircle in a plan view and is configured to discharge the fluid in the guide groove 31 from a fluid storing portion 55 through a blowout port 52.

The fluid storing portion 55 is partitioned into first to third fluid storing portions 55A to 55C by partition walls 51A and 51B.

The first fluid storing portion 55A (a first space) is in communication with a first end portion 57 of the blowout port 52, the second fluid storing portion 55B (a second space) is in communication with an intermediate portion 56 of the blowout port 52, and the third fluid storing portion 55C (a third space) is in communication with a second end portion 58 of the blowout port 52.

A first supply port 53A which supplies the fluid to the first fluid storing portion 55A, a second supply port 53B which supplies the fluid to the second fluid storing portion 55B, and a third supply port 53C which supplies the fluid to the third fluid storing portion 55C are formed on a side surface of the direction changer 206.

In the direction changer 206, the flow volume of the fluid supplied to the fluid storing portions 55A to 55C through the supply ports 53A to 53C is adjusted, and thus it is possible to set the blowing-out flow rate of the fluid in the first end portion 57 and the second end portion 58 and the blowing-out flow rate of the fluid in the intermediate portion 56 to be independent from each other.

For this reason, it is possible to set the blowing-out flow rate of the fluid in the inlet wire portion 33 and the outlet wire portion 34 to be faster than the lowest blowing-out flow rate of the fluid in the other portion in the circumferential direction (the intermediate portion 56).

Since the blowing out flow rate of the fluid becomes fast at the inlet wire portion 33 and the outlet wire portion 34, an Re number thereof becomes faster than an Re number at the other portion (the intermediate portion 56) in the circumferential direction.

3. Adjusting Re Number by Providing Narrow Portion

Figure 12:
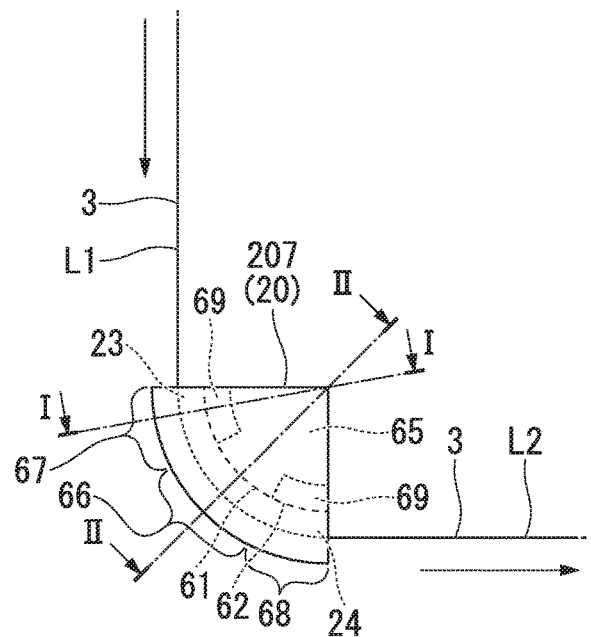
FIG. 12 is a front view showing a fifth example of the direction changer.

A direction changer 207 shown in FIG. 12 is a fifth example of the direction changer 20 and is able to change the direction of the bare optical fiber 3 by 90°.

The direction changer 207 is in the shape of one quarter circle in a plan view and is configured to discharge the fluid in a guide groove 61 from a fluid storing portion 65 through a blowout port 62.

Figure 13A:
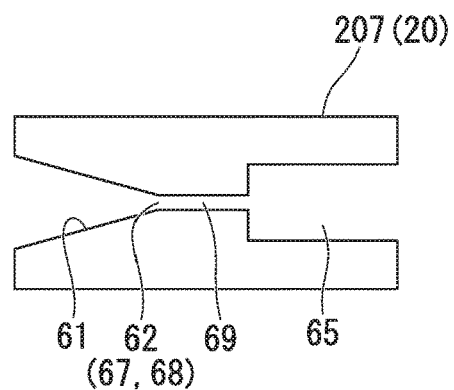
FIG. 13A is a schematic view showing a sectional structure of the direction changer taken along line I-I shown in FIG. 12.

As shown in FIG. 13A, narrow portions 69 and 69 in which the width of a flow path is narrowed by the fluid storing portion 65 are formed between the fluid storing portion 65 and the guide groove 61 in a circumferential direction range in which communication occurs with a first end portion 67 and a second end portion 68 of the blowout port 62.

Figure 13B:
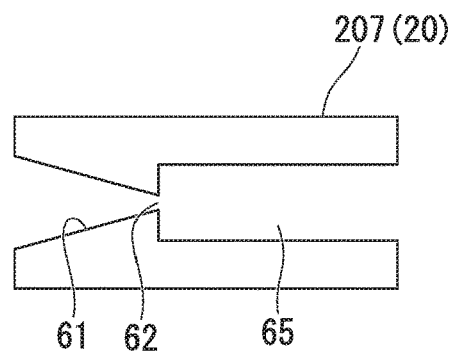
FIG. 13B is a schematic view showing a sectional structure of the direction changer taken along line II-II shown in FIG. 12.

As shown in FIG. 13B, the narrow portion 69 is not formed in a circumferential direction range in which communication occurs with an intermediate portion 66 of the blowout port 62.

For this reason, in the circumferential direction range corresponding to the first end portion 67 and the second end portion 68, a pressure loss at the time of blowing out the fluid increases compared to the circumferential direction range corresponding to the intermediate portion 66.

In the direction changer 207, the narrow portions 69 and 69 are formed in the range corresponding to the first end portion 67 and the second end portion 68, and thus in the inlet wire portion 23 and the outlet wire portion 24, the blowing-out flow rate of the fluid from the blowout port 62 is faster than the lowest flow rate of the fluid in the other portion (the intermediate portion 66).

Since the blowing out flow rate of the fluid becomes fast at the inlet wire portion 23 and the outlet wire portion 24, an Re number thereof becomes faster than an Re number at the other portion (the intermediate portion 26) in the circumferential direction.

Figure 14:
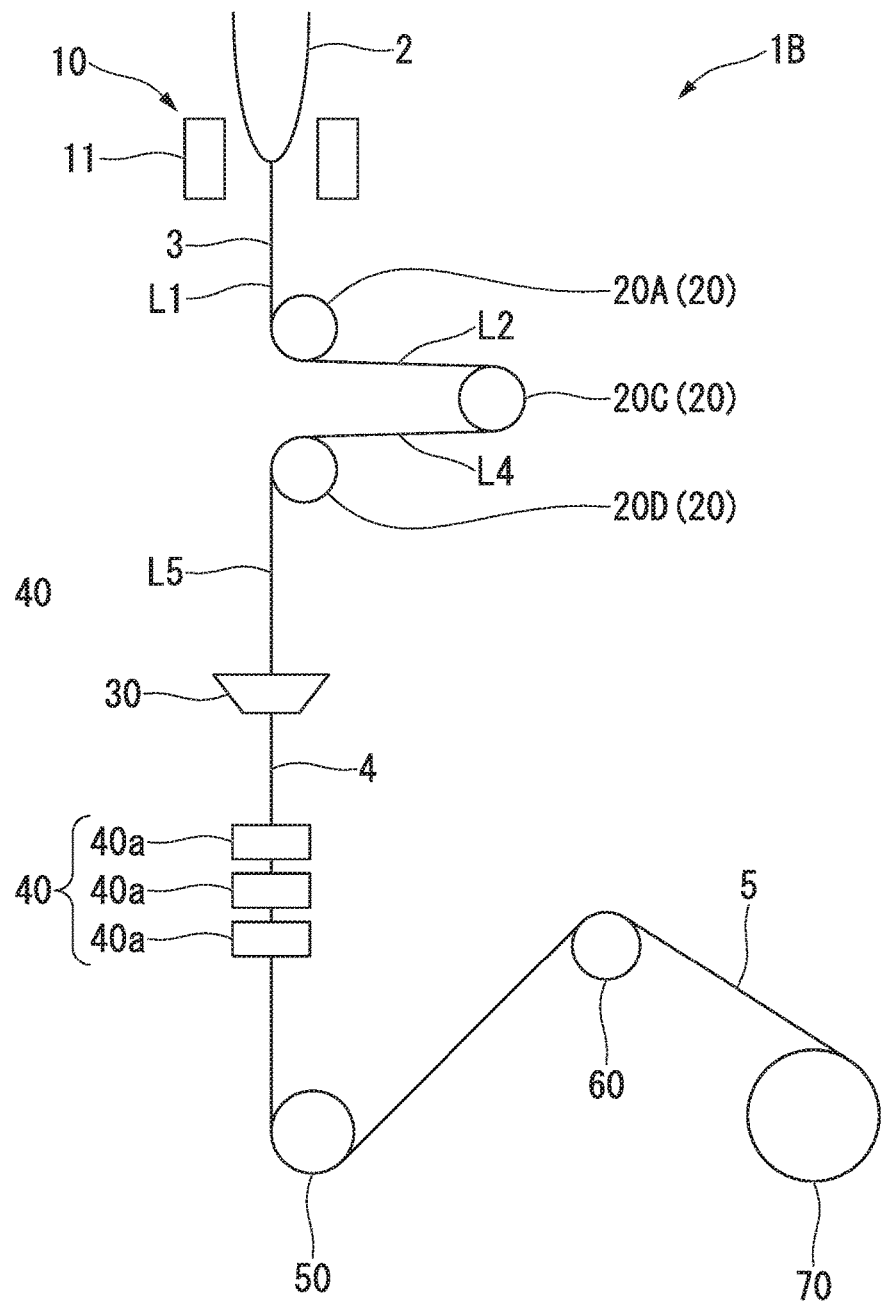
FIG. 14 is a schematic view showing a schematic configuration of a second embodiment of an apparatus of manufacturing an optical fiber according to the present invention.
Figure 15:
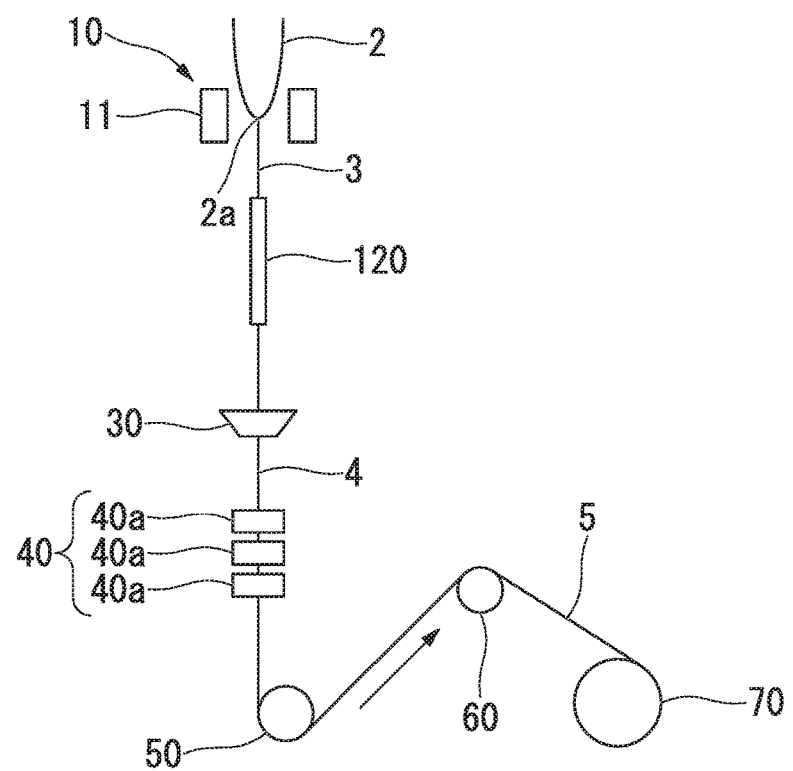
FIG. 15 is a schematic view showing a schematic configuration of an example of an apparatus of manufacturing an optical fiber of the related art.

FIG. 14 is a schematic view showing a schematic configuration of a manufacturing apparatus 1B which is a second embodiment of the manufacturing apparatus of an optical fiber according to the present invention.

The manufacturing apparatus 1B is different from the manufacturing apparatus 1A shown in FIG. 1 in that the manufacturing apparatus 1B includes three direction changers 20 (20A, 20C, and 20D). Hereinafter, the second embodiment of the manufacturing method of an optical fiber of the present invention will be described.

In the manufacturing apparatus 1B, the bare optical fiber 3 which is drawn out from the optical fiber preform 2 to the vertically downward direction (the first path L1) is directed towards the horizontal direction (the second path L2) due to direction change of 90° of the first direction changer 20A.

The bare optical fiber 3 is directed towards a direction opposite to the second path L2 (a third path L4) due to direction change of 180° of the second direction changer 20C and is directed towards the vertically downward direction (a fourth path L5) due to direction change of 90° of a third direction changer 20D.

The bare optical fiber 3 is subjected to the resin coating in the coating unit 30 and the coating layer is cured by the curing unit 40, and thus the optical fiber 5 is obtained.

The optical fiber 5 is wound by the winding means 70 through the pulley 50 and the take-up unit 60.

EXAMPLES

Example 1

The manufacturing apparatus 1A shown in FIG. 1 was prepared.

As the direction changers 20A and 20B, the direction changer 201 shown in FIGS. 3A and 3B was used. A width of the guide groove 21 is uniform in a depth direction.

A turning radius was approximately 62.5 mm. The width of the guide groove 21 (i.e., the width of the guide groove 21 at a position of an innermost periphery of the bare optical fiber 3 in a floating state) is 145 μm.

Re numbers (calculated values) of the direction changers 20A and 20B were approximately 2248.

The fluid introduced to the direction changers 20A and 20B was air, and the temperature thereof was room temperature (approximately 24° C.).

An introduced flow volume of the air was 100 liters/minute with respect to each of the direction changers 20A and 20B.

The first direction changer 20A was disposed in a position in which the temperature of the bare optical fiber 3 was approximately 1000° C.

When the direction changers 20A and 20B were disposed, a centering (position adjustment of the path line) was performed in an accuracy of a pm-order by a centering device using a laser.

The optical fiber preform 2 was drawn by the drawing unit 10, and thus the bare optical fiber 3 (an outer diameter of 125 μm) was obtained. As a drawing speed and drawing tension, general conditions (a drawing speed of 30 m/second, and drawing tension of approximately 150 gf) were adopted.

The bare optical fiber 3 which was drawn out from the optical fiber preform 2 to the vertically downward direction (the first path L1) was subjected to direction change to the horizontal direction (the second path L2) by the first direction changer 20A, and then was subjected to the direction change to the vertically downward direction (the third path L3) by the second direction changer 20B. The length of the second path L2 was approximately 1 m.

In the coating unit 30, the bare optical fiber 3 was coated with an ultraviolet curing resin and irradiated with ultraviolet rays by the UV lamp 40a in the curing unit 40, the coating layer was cured, and thus the optical fiber 5 was obtained.

The optical fiber 5 was wound by the winding means 70 through the pulley 50 and the take-up unit 60.

While manufacturing the optical fiber 5 from the optical fiber preform 2, an air supply to the direction changers 20A and 20B is reduced and the Re number (a calculated value) is adjusted to be 1200.

In addition, while manufacturing the optical fiber 5 from the optical fiber preform 2, an air supply to the direction changers 20A and 20B is increased and the Re number (a calculated value) is adjusted to be 3500.

In the manufacturing method, in both conditions, it was confirmed that the bare optical fiber 3 was not damaged by the direction changers 20A and 20B, and the optical fiber 5 was able to be manufactured with a sufficient yield.

Example 2

In the manufacturing apparatus 1A shown in FIG. 1, an introduced flow volume of the fluid to the direction changers 20A and 20B was controlled by using the position sensor 80 and the control unit 90.

In other words, by the position sensor 80, the positional information of the bare optical fiber 3 (flotation amount in the second direction changer 20B) is obtained to output a detected signal to the control unit 90, and an introduced flow volume of the fluid to the direction changers 20A, 20B is controlled by the control unit 90.

As a control method, a PID controller is employed. Other conditions are in line with Example 1 to manufacture the optical fiber 5.

While manufacturing the optical fiber 5, variation of a linear speed is ±50 m/min at maximum, and variation of the drawing tension is ±25 gf at maximum.

However, in the direction changers 20A, 20B, since the flow volume of the air was controlled in a range of the Re number of 1200-3500, the flotation amount of the bare optical fiber 3 was ±0.05 mm and stable.

In the manufacturing method, it was confirmed that the bare optical fiber 3 was not damaged by the direction changers 20A and 20B, and the optical fiber 5 was able to be manufactured with a sufficient yield.

Example 3

In the manufacturing apparatus 1A shown in FIG. 1, as the direction changers 20A and 20B, a direction changer 201 having an Re-number profile shown in FIG. 8 is used. The width of the intermediate portion 26 in the blowout port 22 is 50 μm, and the minimum width of the first end portion 27 and the second end portion 28 is 45 μm.

As shown in FIG. 2, an inclination angle θ1 of the inside surface 21c of the guide groove 21 with respect to the radial direction D1 was 0.5°. A turning radius was approximately 62.5 mm.

The Re number at a portion excluding the inlet wire portion 23 and the outlet wire portion 24 (i.e., a portion corresponding to the intermediate portion 26) was 2200, and the Re number at the inlet wire portion 23 and the outlet wire portion 24 was 2500. The inlet wire portion 23 and the outlet wire portion 24 are portions in a circumferential direction corresponding to a range having an angle of 30° from each end.

When the direction changers 20A and 20B were disposed, a thread having an outer diameter of 0.5 mm was used instead of the bare optical fiber 3, and was centered by visual contact (position adjustment of the path line).

In the manufacturing method, it was confirmed that the bare optical fiber 3 was not damaged by the direction changers 20A and 20B, and the optical fiber 5 was able to be manufactured with a sufficient yield.

Example 4

The optical fiber 5 was manufactured by using the manufacturing apparatus 1B shown in FIG. 14 as follows.

As the first direction changer and the third direction changer 20A and 20D, the direction changer 201 having the same specification as that used in Example 1 was used.

As the second direction changer 20C, the direction changer 205 shown in FIG. 10 was used.

An Re number at the inlet wire portion 33 and the outlet wire portion 34 is set to 3000. An Re number at an area corresponding to the intermediate portion 46 is set to 1800.

When the direction changers 20A and 20B were disposed, a thread having an outer diameter of 0.5 mm was used instead of the bare optical fiber 3, and was centered by visual contact (position adjustment of the path line).

In the manufacturing method, it was confirmed that the bare optical fiber 3 was not damaged by the direction changers 20A, 20C, and 20D, and the optical fiber 5 was able to be manufactured with a sufficient yield.

Example 5

In the manufacturing apparatus 1A shown in FIG. 1, the optical fiber 5 was manufactured by the same method as that in Example 1 except that the direction changer 207 shown in FIGS. 12 to 13B was used in the direction changers 20A and 20B instead of the direction changer 201

An Re number at the inlet wire portion 23 and the outlet wire portion 24 is set to 3500. An Re number at an area corresponding to the intermediate portion 26 is set to 3000.

When the direction changers 20A and 20B were disposed, a thread having an outer diameter of 0.5 mm was used instead of the bare optical fiber 3, and was centered by visual contact (position adjustment of the path line).

In the manufacturing method, it was confirmed that the bare optical fiber 3 was not damaged by the direction changers 20A and 20B, and the optical fiber 5 was able to be manufactured with a sufficient yield.

Comparative Example 1

The optical fiber 5 was manufactured by using the manufacturing apparatus 1A shown in FIG. 1 by the same method as that in Example 1 except that the Re number was 4000.

When manufacturing the optical fiber 5, the fluctuation of a flotation position of the bare optical fiber 3 as in FIG. 7 was shown.

In the manufacturing method, breaking which was considered to be caused by bringing the bare optical fiber 3 in contact with the inside surface of the guide groove occurred. Thus, the manufacturing yield was not sufficient.

Comparative Example 2

The optical fiber 5 was manufactured by using the manufacturing apparatus 1A shown in FIG. 1 by the same method as that in Example 1 except that the Re number was 1000.

When manufacturing the optical fiber 5, the fluctuation of a flotation position of the bare optical fiber 3 as in FIG. 7 was shown.

In the manufacturing method, breaking which was considered to be caused by bringing the bare optical fiber 3 in contact with the inside surface of the guide groove occurred. Thus, the manufacturing yield was not sufficient.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An apparatus for manufacturing an optical fiber, comprising:
    a drawing portion configured to draw an optical fiber perform and form a bare optical fiber;
    a coating portion configured to dispose a coating layer formed of a resin on an outer circumference of the bare optical fiber; and
    a curing portion configured to cure the coating layer, wherein:
    a direction changer which changes a direction of the bare optical fiber is disposed in any position from the drawing portion to the coating portion;
    the direction changer includes a guide groove which guides the bare optical fiber;
    a blowout port of a fluid which floats the bare optical fiber wired along the guide groove is formed along the guide groove in the guide groove; and
    the blowout port is configured such that a Reynolds number in an inlet wire portion of the bare optical fiber entering the guide groove and a Reynolds number of an outlet wire portion of the bare optical fiber outputting from the guide groove is greater than a Reynolds number in an intermediate portion between the inlet wire portion and the outlet wire portion.

2. The apparatus for manufacturing an optical fiber according to claim 1, wherein the Reynolds number of the fluid in the inlet wire portion and the outlet wire portion is set to be greater than the Reynolds number of the fluid in the intermediate portion such that a width of the blowout ports in the inlet wire portion and the outlet wire portion is set to be smaller than the blowout port in the intermediate portion.

3. The apparatus for manufacturing an optical fiber according to claim 1,
    wherein an inner space portion which transports the fluid to the blowout port is ensured inside the direction changer, and
    the inner space portion includes a first space portion which is in communication with the blowout port of the inlet wire portion and the outlet wire portion, and a second space portion which is in communication with the blowout port of the intermediate portion.

4. The apparatus for manufacturing an optical fiber according to claim 1,
    wherein an inner space portion which transports the fluid to the blowout port is ensured inside the direction changer, and
    the inner space portion includes a first space portion which is in communication with the blowout port of the inlet wire portion, a second space portion which is in communication with the blowout port of the intermediate portion, and a third space portion which is in communication with the blowout port of the outlet wire portion.

5. The apparatus for manufacturing an optical fiber according to claim 1, wherein a narrow portion which is in communication with the blowout ports in the inlet wire portion and the outlet wire portion is formed inside the direction changer, and a pressure loss at the time of blowing out the fluid in the inlet wire portion and the outlet wire portion is greater than the pressure loss in the intermediate portion,
    thereby, the Reynolds number of the fluid in the inlet wire portion and the outlet wire portion is set to be greater than the Reynolds number of the fluid in the intermediate portion.

6. The apparatus of manufacturing an optical fiber according to claim 1, wherein each of the inlet wire portion and the outlet wire portion is provided in a circumferential direction range corresponding to 11.1% to 33.3% of the entire blow-out port.

* * * * *